US008284669B2

(12) United States Patent
Jackson

(10) Patent No.: US 8,284,669 B2
(45) Date of Patent: Oct. 9, 2012

(54) DATA ACKNOWLEDGEMENT APPARATUS AND METHOD

(75) Inventor: Timothy Jackson, Great Chesterford (GB)

(73) Assignee: Plextek Limited, Essex (GB)

( * ) Notice: Subject to any disclaimer, the term of this patent is extended or adjusted under 35 U.S.C. 154(b) by 294 days.

(21) Appl. No.: 12/727,551

(22) Filed: Mar. 19, 2010

(65) Prior Publication Data
US 2010/0195665 A1 Aug. 5, 2010

Related U.S. Application Data

(63) Continuation of application No. PCT/EP2008/062804, filed on Sep. 24, 2008.

(30) Foreign Application Priority Data

Sep. 24, 2007 (GB) .................................. 0718582.0

(51) Int. Cl.
H04J 3/14 (2006.01)
H04B 7/14 (2006.01)
H04L 29/06 (2006.01)
H04L 1/18 (2006.01)

(52) U.S. Cl. ........ 370/236; 370/315; 370/464; 370/469; 370/252; 714/749; 714/750

(58) Field of Classification Search .................. 370/236, 370/252, 254, 255, 315, 389, 464, 466, 469; 714/748–749, 750; 709/224; 455/11.11
See application file for complete search history.

(56) References Cited

U.S. PATENT DOCUMENTS 5,699,367 A * 12/1997 Haartsen ...................... 714/749
6,091,710 A    7/2000 Mawhinney
6,965,568 B1 * 11/2005 Larsen ........................... 370/238
7,984,356 B2 *  7/2011 Chindapol et al. ............ 714/748
2002/0187746 A1 * 12/2002 Cheng et al. .................. 455/11.1
2006/0098616 A1    5/2006 Kish et al.
2008/0317017 A1 * 12/2008 Wiemann et al. ............. 370/389
2009/0003378 A1 *  1/2009 Sachs ............................. 370/466
2009/0049356 A1 *  2/2009 Lin ................................ 714/749
2009/0268742 A1 * 10/2009 Hama ............................ 370/400

FOREIGN PATENT DOCUMENTS

EP    0973303 A2    1/2000
WO  2006024320 A1  3/2006

OTHER PUBLICATIONS

Tsai, et al., Reliable transporting and optimal routing on rate-based for ad hoc networks; Conference Paper, "Emerging Directions in Embedded and Ubiquitous Computing," Seoul, SK, Aug. 2006; (Abstract Only, XP002511771), 2 pages.
Wiemann, H., et al., "A Novel Multi-Hop ARQ Concept," Ericcson Research, 2005 IEEE, pp. 3097-3101.

* cited by examiner

Primary Examiner — Kwang B Yao
Assistant Examiner — Candal Elpenord
(74) Attorney, Agent, or Firm — BainwoodHuang

(57) ABSTRACT

In the sending of data in a network from a sending node to a receiving node via a relay node, the receiving node sends a notification arranged to notify both the sending node and receiving node of receipt of data at the receiving node. Notifications acknowledge that the data has been correctly received over each individual stage of transmission, and further acknowledge to the sending node that data has been correctly transmitted over the whole transmission path and received at the receiving node. The burden on the network of sending acknowledgments is reduced while notifications of data transmission over single stages and over the whole transmission path are provided.

12 Claims, 10 Drawing Sheets

Prior Art

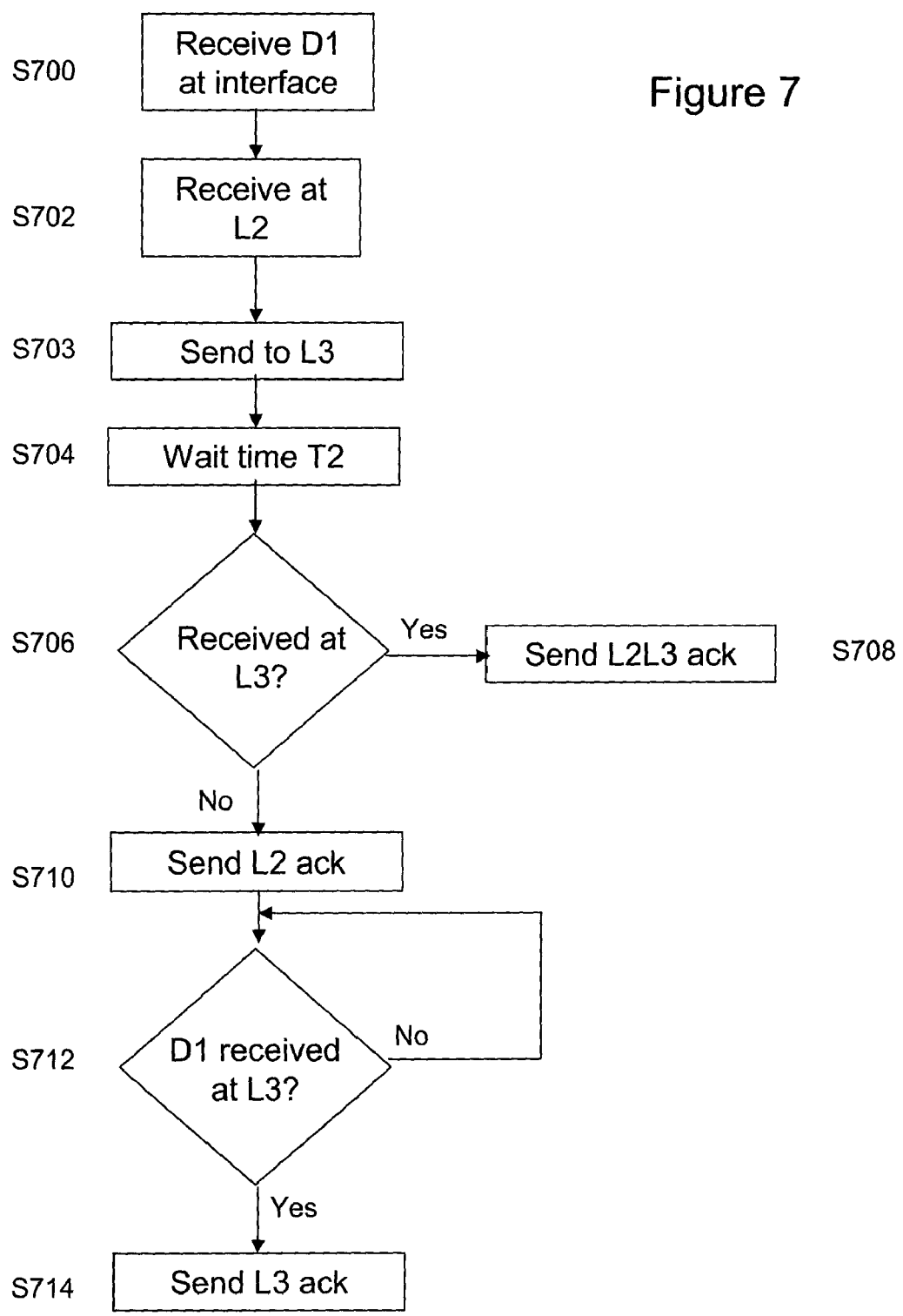

900

| Receiving Node Address | Sending Node Address | 1 | 10 |
|---|---|---|---|
| 902 | 904 | 906 | 908 |

| Type (1002) | Value (1004) | Action (1006) |
|---|---|---|
| L2 | 00 | Cease monitoring. |
| L3 | 01 | Forward to destination address and send L3 ack confirmation to source address. |
| L2L3 | 10 | Cease monitoring and send L3 ack to destination address. |

114

DATA ACKNOWLEDGEMENT APPARATUS AND METHOD

BACKGROUND OF THE INVENTION

The present invention relates to the transmission of data in networks. In particular, the present invention relates to the transmission of notifications for acknowledging receipt of data at nodes of a network.

Networks comprising a plurality of stations or nodes between which data is communicated have become widespread. In such networks, data is typically transmitted across a connection between a source node and a destination node. In many cases, the transmission of data takes place over multiple steps via one or more intermediate nodes, particularly where the nodes are individually not capable of transmitting data over large distances (because, for example, of limited radio transmitting power). The data may be sent in discrete packets, ordered into a sequence. The data may comprise, for example, application data or control data.

The data may be transmitted according to a protocol stack, comprising at least a physical layer (hereinafter L1), which comprises the physical combination of modems, wires, relays etc. over which the signal is sent; a data link protocol layer (hereinafter L2) which handles transmission of data between adjacent nodes in a connection; and a network protocol layer (hereinafter L3) which handles, inter alia, establishing data connections, setting routes for data transmission and data flow within a connection.

In some cases, "unacknowledged" transmission protocols in which the sending node is not informed as to whether data sent has been correctly received at the receiving station are used; however, unacknowledged transmission protocols are problematic where a significant proportion of data is lost or corrupted in transmission, since it becomes difficult to arrange for the lost data to be retransmitted. It is therefore common for notifications of receipt of data to be sent between nodes, and for data to be retransmitted in the event that no corresponding notification is received. Hereinafter, notifications will be referred to as "acks" (an abbreviation of acknowledgement). In the following discussion, data which is acknowledged, but is not itself an ack will be referred to as "primary data"; similarly, data packets comprising such data will be referred to as "primary data packets".

One notification method that such arrangements conventionally use, often referred to as a "point to point" method, is now described with reference to FIG. 1a and FIG. 1b. FIG. 1a shows primary data being transmitted and acknowledged between a source node, an intermediate node and a destination node. At step S300, a primary data packet is transmitted from the source node to the intermediate node. The intermediate node sends an ack at step S302 to notify the source node of receipt of the primary data packet. The primary data packet typically comprises information identifying the destination node as its destination; the destination node analyses the primary data packet to ascertain its destination, and having done so, sends the primary data packet to the destination node at step S304. The primary data packet also typically comprises information identifying the source node as its source; the destination node extracts this information and sends an ack to notify the intermediate node of receipt of the primary data packet at step S306. In this way, primary data packet transmission is acknowledged at each stage of transmission. Acks transmitted according to a point to point acknowledgement method are typically processed by L2; hereinafter they will be referred to as "L2 acks".

If a primary data packet is lost or corrupted during transmission, no corresponding ack is received, which triggers the primary data packet to be resent. FIG. 1b shows an example in which a primary data packet is lost between the intermediate node and the destination node. At step S310, the primary data packet is sent from the source node to the intermediate node; an L2 ack is sent from the intermediate node to the source node at step S312. At step S314, the intermediate node sends the primary data packet to the destination node; however, the primary data packet is not received, perhaps due to interference or environmental conditions that affect transmission of signals between nodes, such as interference from transmission from another radio system, lightening, or "radio fading" in which the signal is cancelled by destructive interference of multiple paths from source node to destination node. The intermediate node monitors for an L2 ack for the primary data packet it has sent for a predetermined time T before resending the primary data packet at step S316. This time the primary data packet is successfully received by the destination node and an L2 ack sent from the destination node to the intermediate node at step S318. As before, non-receipt of an ack would cause the corresponding primary data packet to be resent.

A problem with this method is that, since the source node is not informed of the loss of the primary data packet sent at step S314, it continues to send further primary data packets 320 to the intermediate node; particularly in arrangements where the connection between the intermediate node and the destination node is much less efficient than the connection between the source node and the destination node, this can lead to a large build up of primary data packets at the intermediate node, which may eventually lead to overload of the intermediate node.

According to another acknowledgement method, often referred to as an "end to end" method, primary data packets are not acknowledged on a stage by stage basis; acks are only sent from the destination of a primary data packet to its source. In end to end methods, acks are typically passed from L2 to L3 for processing; from the perspective of L2, the end to end acks are themselves data packets which are either passed to L3 for processing, if at the destination node of the ack, or sent to another node if not. Acks sent according to an end to end method will hereinafter be referred to as "L3 acks". FIG. 2a shows an example arrangement. A primary data packet is sent from a source node to an intermediate node at step S400. The intermediate node analyses the primary data packet and ascertains that it is not the destination of the primary data packet; it therefore does not send an ack to the source node. At step S402, the primary data packet is sent from the intermediate node to the destination node, which analyses the primary data packet and ascertains that it is the destination of the primary data packet. It therefore sends an ack to the source node; this involves the ack being sent from the destination node to the intermediate node at step S404 and from the intermediate node to the source node at step S406.

In end to end methods, any primary data that is lost or corrupted during transmission must be retransmitted from the source, as is now described with reference to FIG. 2b. At step S410, a primary data packet is sent from the source node to the intermediate node. At step S412, the primary data packet is sent from the intermediate node, but does not arrive at the destination node. The source node monitors for an ack for the primary data packet it has sent for a predetermined time T1, before resending the primary data packet at step S414. The primary data packet arrives at the intermediate node, from which it is resent at step S416. This time, the primary data packet is received successfully at the destination node. In response to this, the destination node sends an ack at step 418, which arrives at the intermediate node and is sent to the source node at step S420.

End to end methods suffer from inefficiency because, particularly where a primary data packet is lost or corrupted near to its destination, the primary data packet has to be resent over stages of its transmission route over which it has already been successfully transmitted. In the example described with reference to FIG. 2b, the same primary data packet is sent twice between the source node and the intermediate node, at step S410 and step S414. Further, the primary data packet is also retransmitted when an L3 ack is lost or corrupted during transmission, leading to even greater inefficiency, because the primary data packet then has to be retransmitted over the whole connection, and the corresponding L3 ack retransmitted over part of the connection. End to end methods also suffer from long propagation times between sending the primary data packet and receiving the corresponding ack, which can lead to difficulties, particularly where the primary data packet is being sent in a sequence of packets, because several further packets may have been sent before the source node reacts to a primary data packet not being correctly received, leading to problems with correct sequencing of the data. This is particularly problematic in systems having a high error rate, such as radio transmission.

Some arrangements use both a point to point method and an end to end method independently in the same system. Referring to FIG. 3, in these arrangements a primary data packet is sent from the source node to the intermediate node at step S500. The intermediate node sends an L2 ack to the source node at step S502 and at step S504, the primary data packet is sent from the intermediate node to the destination node. In response to receiving the primary data packet, the destination node sends an L2 ack to the intermediate node at step S506. It also sends an L3 ack at step S508, which is received by the intermediate node.

In this arrangement, the L3 acks are themselves acknowledged at L2; this is because, as mentioned above, from the perspective of L2, an L3 ack is a primary data packet that is sent on and/or processed and acknowledged; failing to acknowledge the L3 acks would therefore lead to the problems of long propagation times and so on described above in relation to end to end methods. Acknowledgements of L3 acks will be referred to hereinafter as L3 ack confirmations; however, in substance L3 ack confirmations may be considered to be L2 acks.

In some cases, the L2 ack and L3 ack corresponding to a given primary data packet may be sent as part of the same data packet. However, conventional L2 acks and L3 acks function independently of one another and are considered herein as separate notifications, irrespective of whether they are carried in the same data packet.

Returning to FIG. 3, at step S510, the intermediate node sends an L3 ack confirmation to the destination node. The intermediate node then sends the L3 ack to the source node at step S512, which in turn sends an L3 ack confirm to the intermediate node at step S514.

Systems using both an end to end acknowledgement method and a point to point acknowledgement method have the disadvantage that a large amount of transmission time is taken up by the transmission of acks, which reduces the transmission time that can be used for transmitting other forms of data, leading to reduced efficiency.

It is an object of the present invention to mitigate at least some of the problems of the prior art.

SUMMARY OF THE INVENTION

In accordance with a first aspect of the present invention, there is provided a relay node for transmitting data in a network, said network comprising said relay node, the receiving node and the relay node being arranged to receive data via the network at a lower protocol layer and a higher protocol layer of a protocol layer stack, and to send notifications identifying receipt of data at the higher protocol layer and at the lower protocol layer, a sending node and a receiving node, said relay node comprising:

an interface for receiving data at the higher and lower protocol layers, said data having been sent from said sending node, wherein said interface is arranged to send said data to said receiving node; and means for monitoring for a first notification, said first notification being for identifying receipt of said data at the higher protocol layer of the stack of said receiving node;

wherein said interface is arranged for receiving said first notification, and said relay node is arranged to cease said monitoring in response to receiving said first notification and to send a second notification to said sending node in response to receiving said first notification, said second notification being for identifying receipt of said data at said higher protocol layer of the stack of said receiving node.

The invention thus provides a relay node capable of being notified of receipt of data at a higher protocol layer (e.g. L3) of a receiving node by a notification and responding to this notification by notifying a further node of the receipt of the data at the higher of the two protocol layers. This is in contrast to prior art relay nodes which are not capable of performing both of these functions in response to a single notification of receipt at a higher protocol layer of the receiving node. Relay nodes according to the present invention thus provide an efficient method of notification.

The first notification may comprise a combined ack which combines features of conventional L2 acks and those of conventional L3 acks described above; hereinafter, such combined acks will be referred to as "L2L3 acks". However, in some arrangements the first notification may comprise an L2 ack according to an embodiment of the present invention. The second notification may comprise a further L2L3 ack or an L3 ack, or in some cases, an L2 ack.

The relay node may comprise a store, e.g. in the form of Random Access Memory (RAM) in a processor of the relay node, for storing the data. It may further be arranged to remove the data from the store in response to receiving the first notification. Thus, data may be stored at the relay node for retransmission in the case that the data is not successfully received, and deleted when the relay node is informed of receipt of the data.

In some embodiments, the relay node comprises means for monitoring for a third notification, the third notification being for identifying receipt of the data at the receiving node. The interface may be arranged for receiving the third notification, and the relay node arranged to cease monitoring in response to receiving the third notification. The relay node may be arranged not to send a notification to the sending node in response to receiving the third notification. The relay node is thus capable of responding differently to different notifications. The third notification may comprise an L2 ack.

The relay node may further be arranged to resend the data in response to not receiving either of the first notification and the third notification. Thus, the relay node resends data for which acknowledgement of receipt is not received.

In some arrangements, the relay node is arranged to monitor for the first notification and the third notification over a predetermined time interval; the relay node may be arranged to resend the data in the event that neither the first notification nor the third notification is received before said predetermined time interval elapses. This provides a convenient method for monitoring for an acknowledgement, and resending data in the event that none is received within a specific time period.

In some arrangements, the relay node is arranged to monitor for a fourth notification, the fourth notification being for identifying receipt of the data at said receiving node. The interface may be arranged for receiving the fourth notification. The relay node may be arranged not to cease the monitoring in response to receiving the fourth notification and to send a fifth notification to the sending node in response to receiving said fourth notification, the fifth notification being for identifying receipt of said data at said receiving node. The fourth notification may comprise an L3 ack. The fifth type of notification may also comprise an L3 ack.

The relay node may be arranged to send a confirmation of receipt of the fourth notification to said receiving node in response to receiving the fourth notification. The confirmation of receipt may be an L3 ack confirmation.

The relay node may be arranged not to send a confirmation of receipt of the first notification to the receiving node in response to receiving the first notification. Some types of notification according to the present invention do not require confirmation of receipt. In some preferred embodiments, the relay node is arranged to derive the second notification from the first notification. This provides a convenient means of providing the second notification, because the information required for the second notification (which may be an L3 ack) is typically contained in the first notification (which may be an L2L3 ack).

The data may comprise an identifier thereof, and the second notification can contain the identifier. In some arrangements, the relay node comprises an indication of a number of sets of data received at the receiving node, the indication also being contained in the second notification. The second notification may comprise a further indication, the further indication indicating a number of sets of data received at the relay node. These features allow the transmission and acknowledgement of data to be easily monitored and tracked. The first and second indications may indicate data packet numbers.

In some arrangements, the interface comprises a plurality of interfaces, for example one for receiving data and another for sending data, or one for receiving data at each protocol layer of the protocol stack.

In accordance with a second aspect of the present invention, there is provided a receiving node for receiving data in a network, said network comprising said receiving node, a relay node and a sending node, the receiving node and the relay node being arranged to receive data via the network at a lower protocol layer and a higher protocol layer of a protocol stack, said receiving node comprising means for receiving a first set of data, said first set of data having been sent from said sending node via said relay node, wherein said receiving node is arranged to create and send a first type of notification, said first type of notification comprising information for notifying said relay node of receipt of said first set of data at the lower protocol layer of the stack of said receiving node, and being for notifying said sending node of receipt of said first set of data at the higher protocol layer of the stack of said receiving node.

This aspect of the invention thus provides a receiving node capable of creating and sending notifications that are for use in notifying a plurality of nodes that data has been received at a plurality of layers of a plurality of protocol layers; this is in contrast to prior art notifications, which are only capable of notifying a single node of receipt of data. The first type of notification may comprise an L2L3 ack In some preferred embodiments, the receiving node is arranged to create and send a second type of notification (e.g. an L2 ack) in response to receiving a second set of data. The second type of notification is for notifying the relay node of receipt of the second set of data at the receiving node and not for notifying the sending node of receipt of the second set of data at the receiving node. Additionally or alternatively, the receiving node may be arranged to create and send a third type of notification (e.g. an L3 ack) in response to receiving the second set of data. The third type of notification is for notifying the sending node of receipt of the second set of data at the receiving node and not for notifying the relay node of receipt of the second set of data at the receiving node. The receiving node is capable of creating and sending a variety of types of notification, according to requirements.

In some arrangements, the receiving node is arranged to monitor for a confirmation of receipt of the third type of notification at the relay node and to cease monitoring in response to receiving the confirmation. The receiving node may further be arranged to resend the third type of notification in response to not receiving the confirmation. The relay node is thus capable of resending notifications in the event that their successful receipt is not confirmed.

In some embodiments, the receiving node is arranged to not monitor for a confirmation of receipt of the first type of notification at the relay node. Some types of notification according to the present invention do not require confirmation of receipt.

In some preferred embodiments, the receiving node is arranged to process data sequentially through a stack of protocol layers, said stack comprising a first protocol layer and a second protocol layer. The first protocol layer may comprise a data link layer for transmitting data between adjacent nodes of a connection (L2), and the second protocol layer may comprise a network layer for establishing data connections (L3). The invention may thus be implemented in systems that transmit according to a protocol stack.

The receiving node may be arranged to send the first type of notification (e.g. an L2L3 ack) in response to receiving the first set of data at the first protocol layer and at the second protocol layer. Additionally, or alternatively, the receiving node may be arranged to send the second type of notification (e.g. an L2 ack) in response to the second set of data being received at the first protocol layer (e.g. L2) and not received at the second protocol layer (e.g. L3). Additionally, or alternatively, the receiving node may be arranged to send the third type of notification (e.g. an L3 ack) in response to the second set of data being received at the second protocol layer. Thus, embodiments of the present invention may be implemented in accordance with characteristics of a protocol stack according to which transmission takes place.

In some arrangements, the first set of data and the second set of data are members of a sequence of sets of data, each member comprising an indicator of a position in the sequence, and the receiving node comprises means for determining the position of a given set of data in the sequence. The first type of notification may comprise an indicator of a position in the sequence of the first set of data. The second type of notification may comprise an indicator of a position in the sequence of the second set of data. The third type of notification may comprise an indicator of a position in the sequence of the second set of data. These features facilitate monitoring of notification and other data when transmitting data in a sequence.

In some embodiments, instances of each of the first type of notification, the second type of notification and the third type of notification comprise an identifier of the type of notification to which said instance belongs. This provides a convenient means of identifying notifications.

In accordance with a third aspect of the present invention, there is provided a method of transmitting data in a network, said network comprising a sending node, a relay node and a receiving node, said method comprising:

receiving data sent from said sending node at said relay node, and sending said data to said receiving node;

receiving a notification at said relay node, said notification being for notifying said sending node of receipt of said set of data at said receiving node;

determining whether said notification is of a first type or another, different, type of notification;

in the case that said notification is determined to be of the first type, not sending a confirmation of receipt of said notification at said relay node to said receiving node;

in the case that said notification is determined to be of the other type, sending said confirmation of receipt, wherein said first type of notification is for notifying said relay node of receipt of said data at said receiving node.

In some arrangements, the notification comprises an identifier of a type of notification and said determining comprises using said identifier.

The method may comprise comparing said identifier with a predetermined set of identifiers so as to determine the type of notification. The predetermined set of identifiers may be stored at said relay node. These features provide a convenient method of identifying types of notifications.

In accordance with a fourth aspect of the present invention, there is provided a node adapted to perform a method according to a third aspect of the present invention.

In accordance with a fifth aspect of the present invention, there is provided a computer program comprising a set of executable instructions, which, when executed, cause a node to perform a method according to a third aspect of the present invention.

Further features and advantages of the invention will become apparent from the following description of preferred embodiments of the invention, given by way of example only, which is made with reference to the accompanying drawings.

BRIEF DESCRIPTION OF THE DRAWINGS

FIG. 7 is a flow diagram showing the operation of a sending node receiving and acknowledging data in accordance with an embodiment of the present invention;

DETAILED DESCRIPTION OF THE INVENTION

Figure 4:
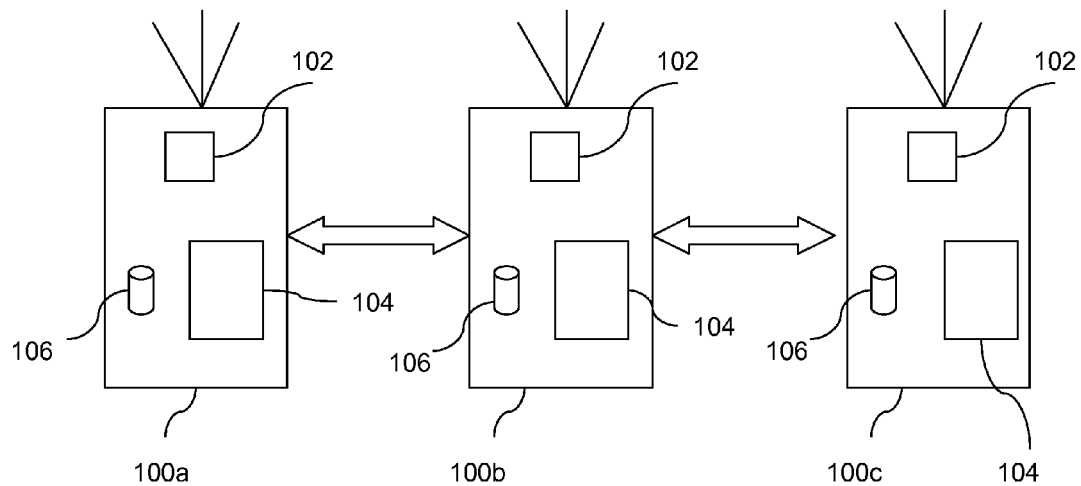
FIG. 4 is a block diagram showing a sending node, a relay node, a receiving node, components of the nodes and connections between them, in accordance with an embodiment of present invention.

FIG. 4 shows a system in which embodiments of the present invention may be implemented. The system shown comprises a sending node 100a, a relay node 100b and a receiving node 100c, but such systems can and often do comprise more than the three nodes shown. Each node 100a, 100b, 100c comprises an interface 102 for transmitting and/or receiving data, a processing unit 104 for processing data and a store for storing data; functions of these components will be described below. Each node 100a, 100b, 100c may comprise a metering device, such as a utility meter, a personal computer, a network data router or a data acquisition device for e.g. controlling an monitoring street lamps, horticultural irrigation systems, burglar alarms or vending machines, but the invention is not limited to such devices. Data may be transmitted between the nodes 100a, 100b, 100c over a radio link. Each of the nodes 100a, 100b, 100c may be capable of duplex communications, with Time Division Duplex (TDD) used to multiplex signals onto a single carrier, though other types of communication between the nodes are possible. Data may be transmitted according to a frame structure. In the following discussion, it will be assumed that all data, including acks, is transmitted in data packets, and that each node processes data according to a protocol stack including L2 and L3 described above; however, the invention is not limited to such arrangements.

In the arrangement shown, direct communication is possible between sending node 100a and relay node 100b, and between relay node 100b and receiving node 100c, but not between sending node 100a and receiving node 100c; this may be due to, for example, receiving node 100c being out of range of a signal from sending node 100a, and/or vice versa. However, a connection may be formed between sending node 100a and receiving node 100c by each of the sending node 100a and the receiving node exchanging data with the relay node 100b, allowing indirect communication between the sending node 100a and the receiving node 100c. It is to be understood that in many arrangements the specific role of each individual node is not fixed, with each node being capable of acting as a sending node, a receiving node or a relay node.

Figure 5A:
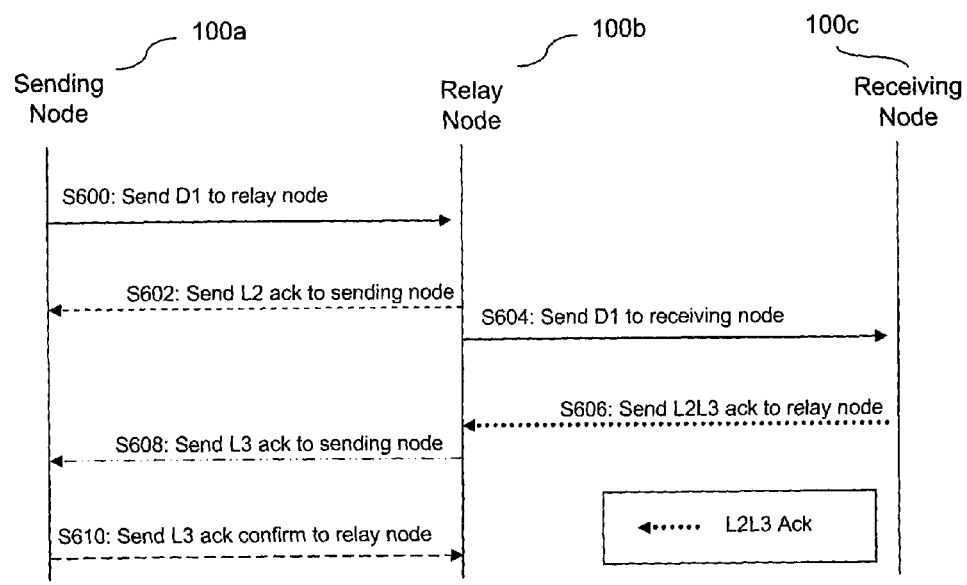
FIG. 5a is a schematic timing diagram showing a first example of data being sent and acknowledged in a system comprising a sending node, a relay node and a receiving node in accordance with a first embodiment of the present invention.

FIG. 5a shows primary data being transmitted and acknowledged according to an embodiment of the present invention. At step S600, a primary data packet D1 is sent from the sending node 100a to the relay node 100b. On receiving packet D1, the relay node 100b sends an L2 ack to the sending node 100a at step S602; it also sends packet D1 onwards to the receiving node 100c at step S604. At step S606, the receiving node 100c sends a combined ack to the relay node; this combined ack is capable of performing functions both of conventional L2 acks and conventional L3 acks, as will be described below. Combined acks will hereinafter be referred to as L2L3 acks.

The relay node 100b receives the ack and analyses it to ascertain the type of ack, as will be described below. Having ascertained that the ack is an L2L3 ack, the relay node 100b sends an L3 ack to the sending node 100a at step S608. The sending node 100a receives the L3 ack, and sends an L3 ack confirmation to the relay node at step S610. Unlike a conventional L2 ack sent from a receiving node 100c, which only notifies a relay node 100b of receipt of data, and unlike a conventional L3 ack sent from a receiving node 100c, which is only intended to notify a receiving node 100c of receipt of data, an L2L3 ack according to the present invention causes both the relay node 100b and the sending node 100a to be notified of receipt of data at the receiving node 100c.

Figure 1A:
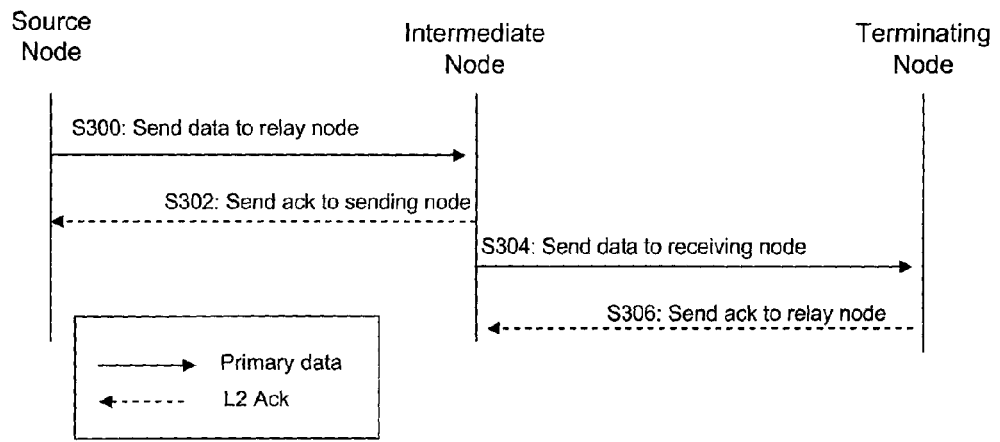
FIG. 1a is a schematic timing diagram showing a first example of data being sent and acknowledged in a system comprising a source node, an intermediate node and a terminating node according to a prior art point to point acknowledgement method.
Figure 1B:
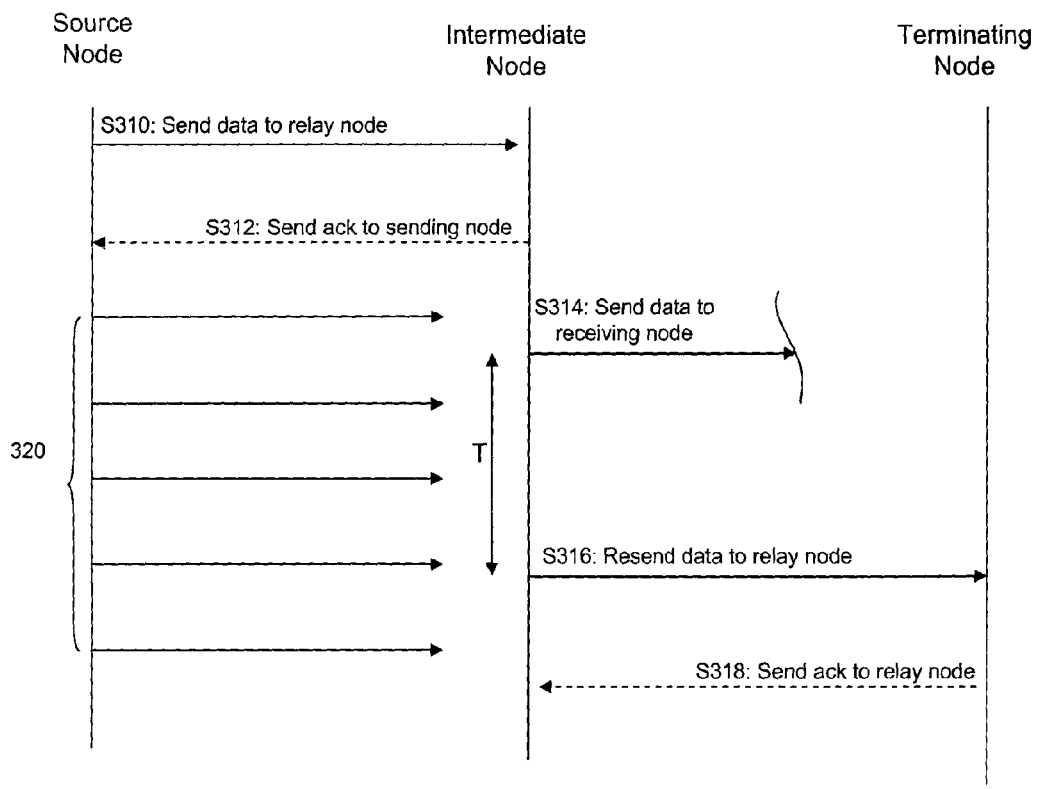
FIG. 1b is a schematic timing diagram showing a second example of data being sent and acknowledged in a system comprising a source node, an intermediate node and a terminating node according to a prior art point to point acknowledgement method.
Figure 2A:
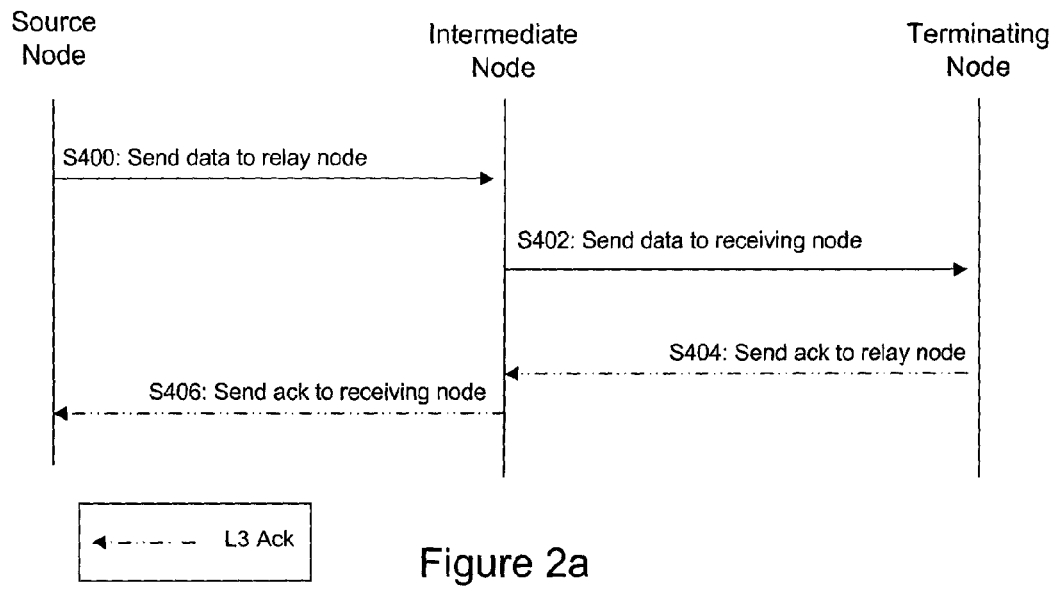
FIG. 2a is a schematic timing diagram showing a first example of data being sent and acknowledged in a system comprising a source node, an intermediate node and a terminating node according to a prior art end to end acknowledgement method.
Figure 2B:
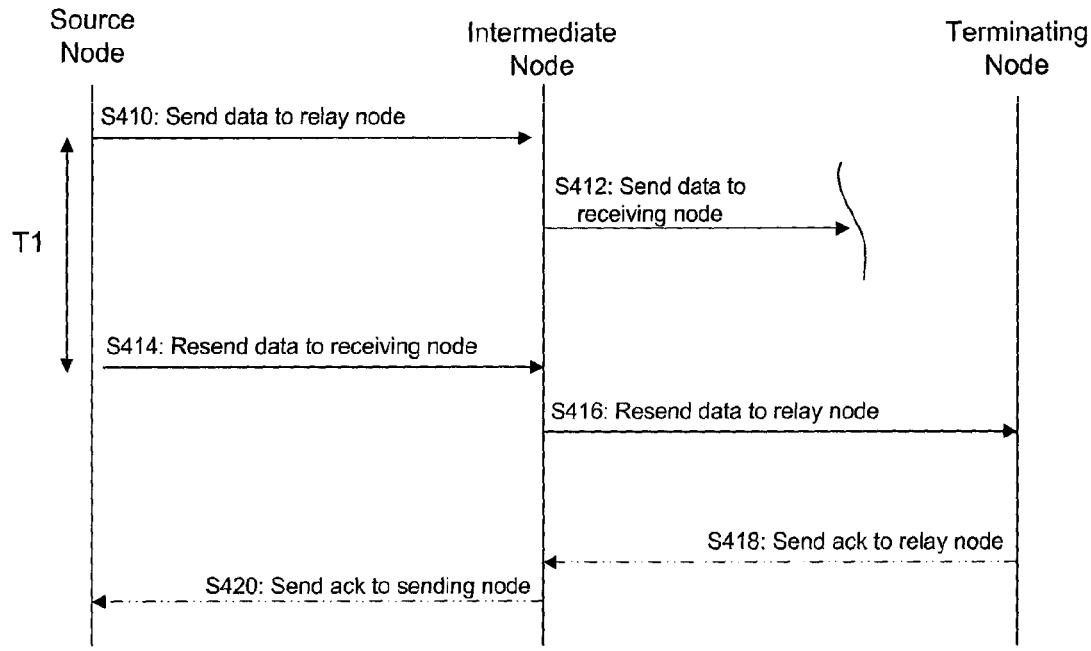
FIG. 2b is a schematic timing diagram showing a second example of data being sent and acknowledged in a system comprising a source node, an intermediate node and a terminating node according to a prior art end to end acknowledgement method.
Figure 3:
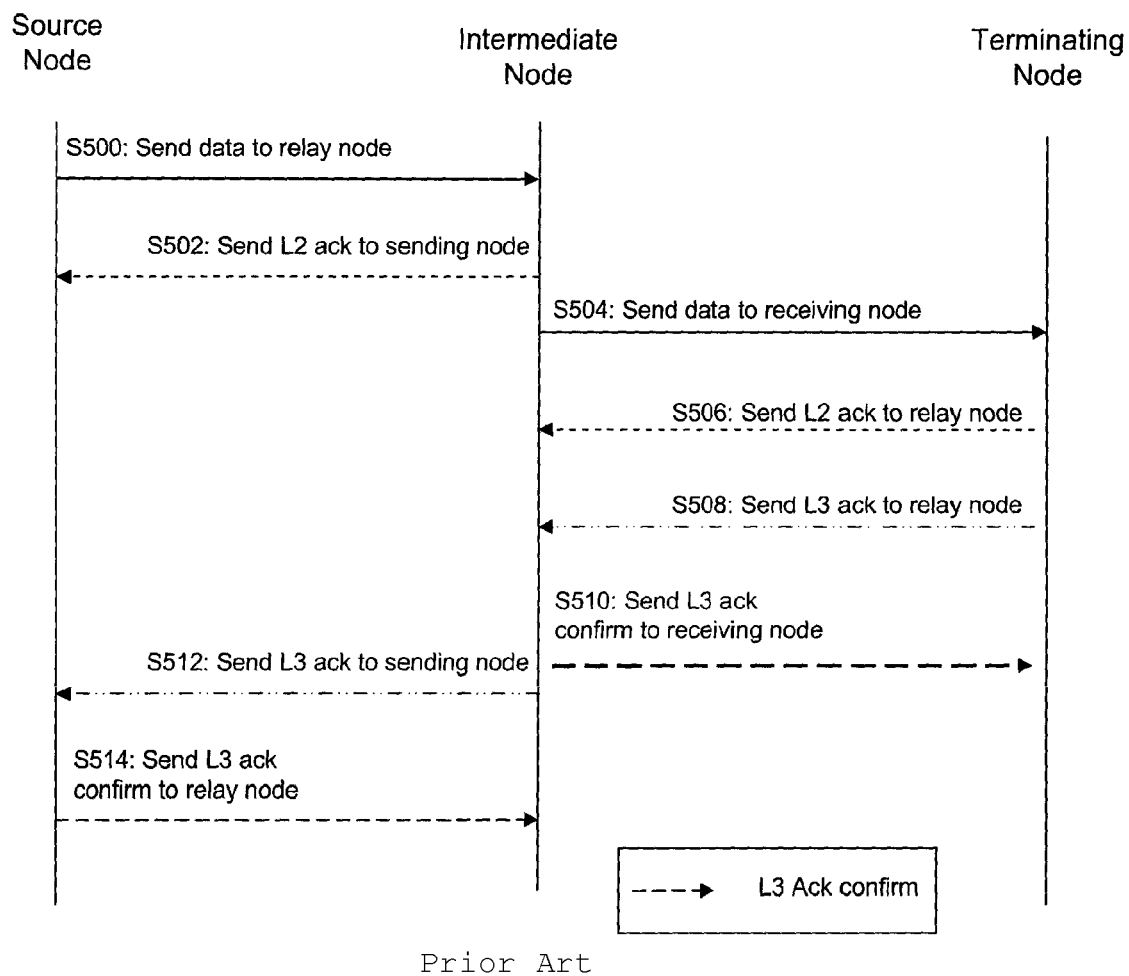
FIG. 3 is a schematic timing diagram showing a prior art system in which both an end to end acknowledgement method and a point to point acknowledgement method are used.

It should be noted that, in contrast to an L3 ack, no ack confirmation is required for the L2L3 ack. This is because, as is explained below, the relay node 100b monitors for receipt of the L2L3 ack and, if the L2L3 ack is not received, resends packet D1, which then causes the L2L3 ack to be resent from the receiving node 100c. Further, unlike the system described in relation to FIG. 3, in which both an L2 ack and an L3 ack are sent in response to receiving primary data at the receiving node, in this embodiment of the present invention, only a single ack is sent. Embodiments of the present invention thus provide advantages of both end to end methods and point to point methods, whilst requiring fewer acks than systems in which end to end methods and point to point methods are used together.

Figure 5B:
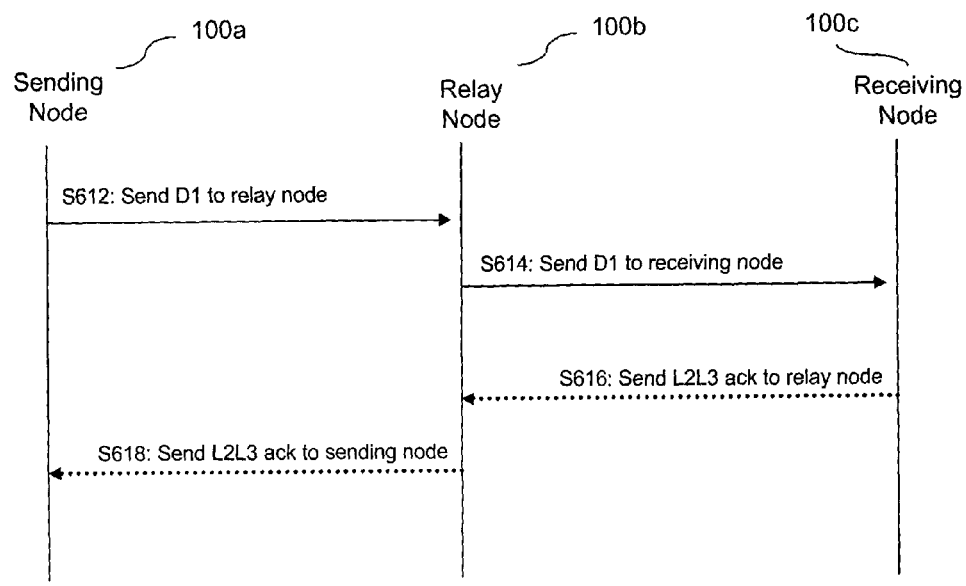
FIG. 5b is a schematic timing diagram showing a second example of data being sent and acknowledged in a system comprising a sending node, a relay node and a receiving node in accordance with a first embodiment of the present invention.

In some arrangements, an L2L3 ack may be sent from the relay node 100b as well as from the receiving node 100c, as will now be described with reference to FIG. 5b. At step S612 a data primary data packet D1 is sent from the sending node 100a to the relay node 100b. The relay node 100b sends D1 to the receiving node 100c at step S614. However, unlike the arrangement described above in reference to FIG. 5a, in this arrangement, the relay node 100b does not immediately send an L2 ack to the sending node, but monitors for an L2L3 ack from the receiving node 100c for a predetermined length of time. In the example shown, and within the predetermined period of time, the receiving node 100c sends an L2L3 ack at step S616 causing the relay node 100b to send an L2L3 ack to the sending node at step S618. This further reduces the number of acks sent, since a single L2L3 ack is sent in place of the L2 ack and L3 ack of steps S602 and S608 respectively in FIG. 5a, and because the L3 ack confirm of step S610 is also not required. If no L2L3 ack is received at the relay node 100b before the predetermined time period lapses, the relay node 100b sends an L2 ack, as described in relation to FIG. 5a (at step S602).

Figure 6:
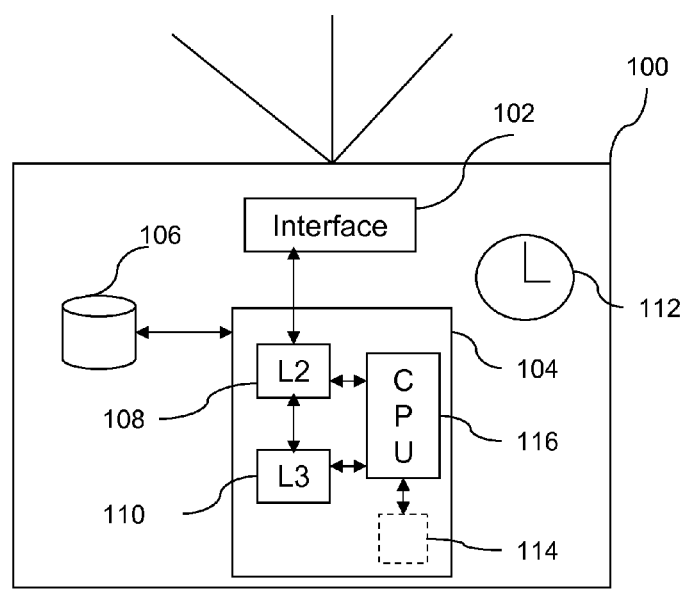
FIG. 6 is a detailed block diagram of a general node and components of the general node, in accordance with an embodiment of the present invention.

FIG. 6 is a detailed block diagram showing components of a general node 100 in accordance with embodiments of the present invention. The general node 100 may function as a sending node 100a, a relay node 100b or a receiving node 100c, and it is to be understood that each of these nodes may comprise the components described here in relation to the general node 100. The general node 100 comprises an interface 102, a store 106, a clock 112 and a processing unit 104 which includes a CPU 116, together with an L2 processing component 108, an L3 processing component 110 and a reference table 114. The processing components 108, 110 can operate under control of the CPU 116 so as to process data received from and transmitted to the relay node 100b via the interface 102. In use, the L2 processing component 108 receives data from the interface 102, processes the data and sends data to and receives data from the L3 processing component 110, which also processes data. Either or each of the L2 processing component 108 and the L3 processing component 110 may comprise a plurality of components. Functions of the reference table 114 will be described below with reference to FIG. 10.

In some embodiments, some or all of the individual components of the general node 100 represented in FIG. 6 may be individual hardware components; in other embodiments, some or all of the components may be software components running on the general node 100. In particular, the L2 processing component 108 and the L3 processing component typically each comprise one or more software components, but in some instances may comprise one or more hardware components, such as an Application Specific Integrated Circuit (ASIC). In some embodiments, some or all of the individual components represented may be combined together into a single component.

FIG. 7 shows the operation of a receiving node 100c in receiving and acknowledging primary data. At step S700, the receiving node 100c receives a primary data packet D1 at the interface 102. The interface then passes packet D1 to the processing unit 104, where it is received at the L2 processing component 108. Packet D1 is analysed to determine, inter alia, whether the receiving node 100c is the destination node; in the present example, we are assuming that it is. In response to determining that the receiving node 100c is the destination of packet D1, packet D1 is sent to the L3 processing component 110 at step S703. If the receiving node 100c were not the destination of packet D1, packet D1 would not be sent to the L3 processing component 110; instead it would be sent to another node, and the following process would not apply.

At step S704, the processing unit 104 waits for a predetermined length of time T2, before determining at step S706 whether packet D1 has been received at the L3 processing component 110. The value of time T2 may be selected based on the allocation of slots to primary data and acks within the frame structure used for transmission, or more specifically the corresponding delay between slots of a given type for successively transmitted frames, since the sending of an ack must be delayed until the time of the next available slot for sending acks. In other cases, the processing unit 104 may be arranged to delay sending the ack by time T2 in order to provide time for packet D1 to be received at the L3 processing component 110. Time T2 may be measured starting from the time at which packet D1 is received by the processing unit, or from some other point.

The processing unit 104 determines at step S706 whether packet D1 has been received at the L3 processing component 110; if it has, then an L2L3 ack is created and sent via the interface 102 at step S708. If packet D1 has not been received at the L3 processing component 110, the processing unit 104 sends an L2 ack at step S710. The processing unit 104 then proceeds to step S712 where it checks again whether packet D1 has been received at the L3 processing component 110; this step is repeated until the determination is that the packet D1 has been received, in response to which an L3 ack is sent at step S714. In some cases, packet D1 is not received at L3 of the receiving node 100c (i.e. not received at the L3 processing component 110 of the receiving node 100c), perhaps due to the L3 processing component 110 being unable to receive data; this may be due to, for example, buffers of the L3 processing component 110 being full. In such cases, since neither an L2L3 ack nor an L3 ack has been sent, the sending node 100a for packet D1 may eventually resend packet D1 to the receiving node 100c, which may trigger the processing unit 104 to cease iterating step S712. Additionally, or alternatively, if neither a L2L3 ack nor an L3 ack has been received within a given period of time, the sending node 100a may determine that the connection with the receiving node 100c is not functioning correctly, and attempt to send D1 over a new connection.

It should be noted that, although in the above example an L2 ack is sent in the case that packet D1 is not received at the L3 processing component 110 within time T2, in some arrangements, the processing unit 104 is arranged to wait until packet D1 is received at the L3 processing component 110 before sending any acks at all i.e. it may be that no L2 acks or L3 acks are independently sent from the receiving node 100c in response to receiving packet D1.

It should further be noted that the steps of sending an L2L3 ack, an L2 ack and an L3 ack at steps S708, S710 and S714 respectively include creating the acks. The structure of acks according to the present invention will be described below.

Figure 8:
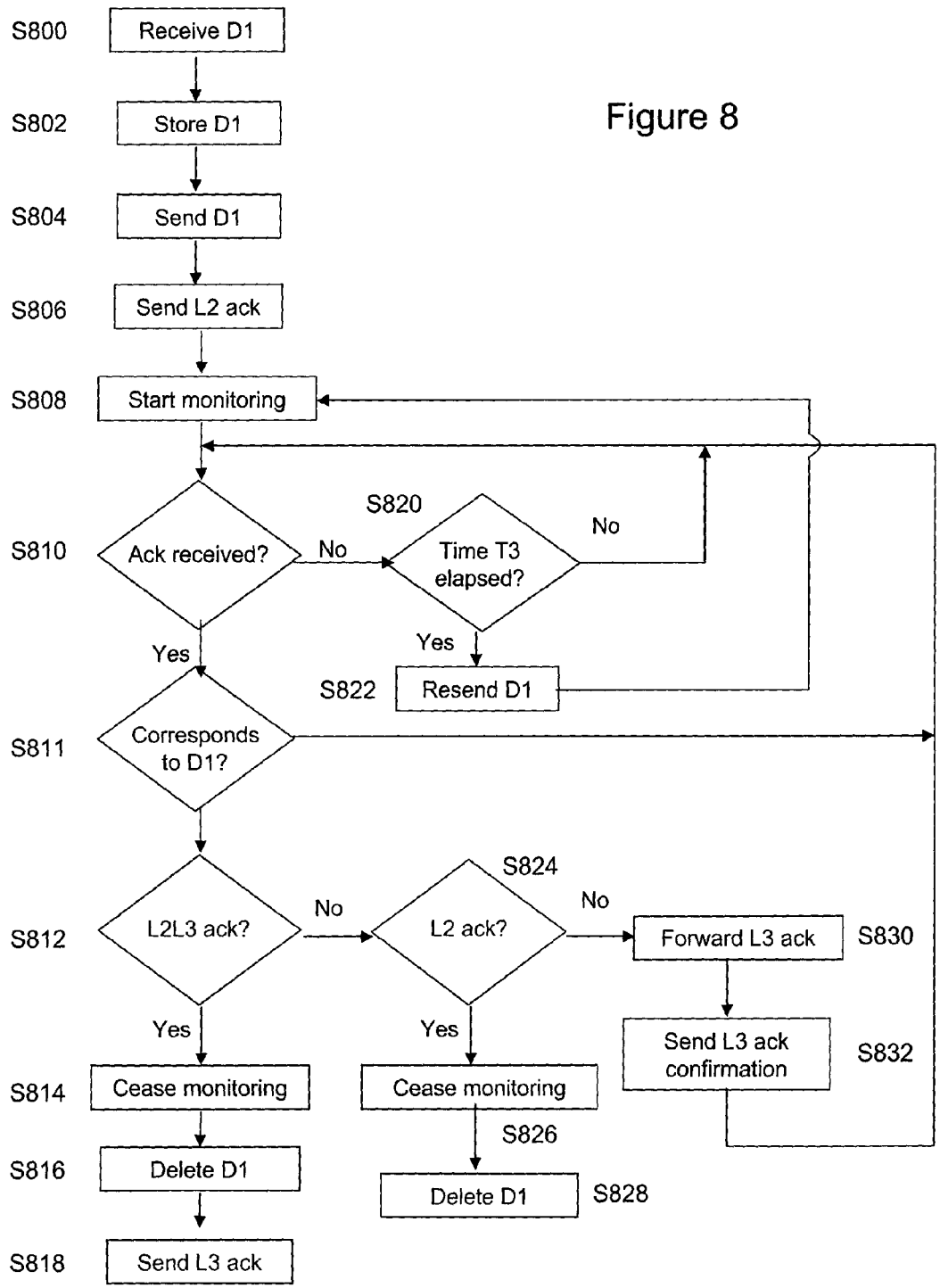
FIG. 8 is a flow diagram showing the operation of a relay node transmitting and acknowledging data in accordance with a first embodiment of the present invention.

FIG. 8 is a flow diagram showing the action of a relay node 100b in transmitting and acknowledging primary data. At step S800, the relay node receives packet D1; packet D1 is passed via the interface 102 to the processing unit 104, where it is received by the L2 processing component 108. Packet D1 is analysed to determine whether the relay node 100b is the destination for packet D1; in this case, it is not, so packet D1 is not passed to the L3 processing component 110. At step S802, packet D1 is stored in the store 106; this is necessary in case packet D1 needs to be resent, as is described below. At step S804, packet D1 is sent to the receiving node 100c, via the interface 102. Since packet D1 has only been received at the L2 processing component, and not the L3 processing component 110, an L2 notification is sent to the sending node 100a at step S806. At step S808, the processing unit 104 starts monitoring for an L2 ack or an L2L3 ack corresponding to packet D1.

At step S810, the processing unit 104 determines whether an ack has been received. If no ack has been received, the processing unit determines at step S820 whether a predetermined time period T3 has elapsed. If time period T3 has elapsed, then packet D1 is retrieved from the store 106 and resent to the receiving node 100c at step S822; the process then returns to step S808. In some arrangements, the relay node monitors the number of times that D1 is resent and, if no ack is received after a predetermined number of resending attempts, the relay node ceases to resend. If it is determined that time period T3 has not elapsed, the process returns to step S810, and a further determination as to whether an ack has been received is made. Time period T3 may be measured from the time at which the processor unit 104 starts monitoring at step S808, or from some other point. The length of time period T3 may be set at a constant value for all types of data packet, or it may be varied according to, for example, the content of packet D1 or data flow conditions within the network.

Returning to step S810, if an ack has been received, the processing unit 104 determines at step S811 whether the ack corresponds to packet D1; this step is described in more detail below. If the ack does not correspond to packet D1, the process returns to step S810; it should be noted that although this process does not process this ack any further, a parallel process may process the ack in relation to the primary data packet to which it corresponds.

If the ack does correspond to packet D1, the processor unit 104 determines at step S812 whether the ack is an L2L3 ack. If it is determined that it is an L2L3 ack, the monitoring started at step S808 ends, since receipt of the L2L3 ack confirms that packet D1 has been successfully received at the receiving node 100c. Packet D1 is then deleted from the store 106 at step S816 and an L3 ack is thereafter or concurrently sent to the sending node 100a (step S818); this L3 ack may be generated by the processing unit 104 of the relay node 100b, or the relay node 100b may forward the L2L3 ack on to the sending node 100a, the L2L3 ack acting as an L3 ack for this purpose.

If it is determined at step S812 that the ack received is not an L2L3 ack, the processing unit 104 determines at step S824 whether the ack received is an L2 ack. As described above with reference to FIG. 7, L2 acks and/or L3 acks, rather than L2L3 acks may be sent where a data packet is received at L2, but not L3, of a receiving node 100c, perhaps due to data corruption, or where there is delay between the data being received at the respective layers the receiving node 100c. Further, L2 and/or L3 acks may be used where the relay node 100b receives the ack from another relay node 100b, rather than directly from a receiving node 100c. Accordingly, the relay node 100b can optionally additionally be configured to act upon L2 acks and L3 acks, as shown at steps S824 onwards. More specifically, if it is determined that the ack received is an L2 ack, the monitoring started at step S808 ends at step S826, since the L2 ack confirms that packet D1 has been successfully received at the receiving node 100c. Packet D1 is then deleted from the store 106 at step S828.

If it is determined at step S824 that the ack received is not an L2 ack, then the only remaining possibility in this example is that it is an L3 ack; this L3 ack is forwarded to the sending node at step S830 and an L3 ack confirmation sent to the sending node at step S832. The process then returns to step S810.

Figures 9, 10:
FIG. 9 is a schematic diagram showing a structure of a notification according to an embodiment of the present invention.
FIG. 10 is a schematic diagram of a structure of a reference table according to an embodiment of the present invention.

Turning now to FIG. 9, the structure of acks sent by the receiving node 100c in accordance with embodiments of the present invention will be described. FIG. 9 shows an example structure of an ack 900. In this example, the ack 900 is sent as a single data packet, but the present invention is not limited to such cases. The ack 900 comprises a source address 902, a destination address 904, a packet number 906 and an ack identification value 908. In this example, the source address 902, which identifies the node at which the ack 900 is created and sent, is the receiving node address and the destination address 904 is the sending node address. The packet number 906 identifies the data packet to which the ack 900 corresponds; here it has the value 1. The ack identifier 908 identifies the ack 900 as either an L2 ack, an L3 ack or an L2L3 ack.

FIG. 10 shows the content of reference table 114, which the relay node 100b uses to perform functions such as identifying the type of ack at steps S812 and S824 described above with reference to FIG. 8. The reference table 114 comprises a value column 1004, which lists possible values for the ack identifier 908 described above, and an action column 1006, which indicates a corresponding relay node 100b action for each ack identifier value. A type column 1002, showing ack types corresponding to the values and actions, is also shown here for ease of reference, but reference tables will not typically comprise this column. Although not represented in FIG. 10, the reference table 114 may also contain entries relating to L3 ack confirmations.

On receiving a data packet, the relay node 100b determines whether the data packet comprises an ack identifier 908; if it does, this identifies that the data packet is an ack. The relay node 100b reads the value of the packet number 906 to determine to which data packet the ack 900 corresponds. It next reads the value of the ack identifier 908 and compares this to the values in the value column 1004 of the reference table 114, and looks for a matching value. When a match is found, the relay node looks in the corresponding entry in the action column 1006 and performs the action specified therein. In the table of FIG. 10, a value of 00 for the ack identifier 908 corresponds to an L2 ack, and triggers the relay node 100b to cease monitoring; a value of 01 for the ack identifier 908 corresponds to an L3 ack, and triggers the relay node 100b to forward the ack to the destination address 904 and to send an L3 ack confirmation to the source address 902; and a value of 10, which corresponds to an L2L3 ack, triggers the relay node 100b to cease monitoring and send an L3 ack to the destination address 904.

System Using L2 Acks

A further embodiment of the present invention is now described, in which a sequence of primary data packets D(1), D(2)..., each having a packet number N indicating a position in the sequence, is sent from the sending node 100a to the receiving node 100c via the relay node 100b. In this further embodiment, neither L3 acks nor L2L3 acks are used; instead each L2 ack is arranged to contain an L2 packet number (L2PN) and an L3 packet number (L3PN). The L2PN indicates the packet number of the last primary data packet correctly received by the node sending the L2 ack. The L3PN indicates the packet number of the last primary data packet correctly received in sequence at the L3 processing component 110 of the node terminating the connection i.e. the destination node of each of the primary data packets. In the following discussion the notation A(N, M) will be used to indicate an L2 ack having an L2PN of N and an L3PN of M. A node transmitting primary data and acks keeps a record or records of an L2PN and an L3PN corresponding to that node i.e. the packet number of the last primary data packet received correctly and in sequence by the node, and the L3PN of the last ack received by the node respectively.

It is to be understood that the primary data packets and acks referred to here may comprise information such as a destination node address, a source node address, information indicating the type of data contained within the data packet/ack, and so on.

Figure 11:
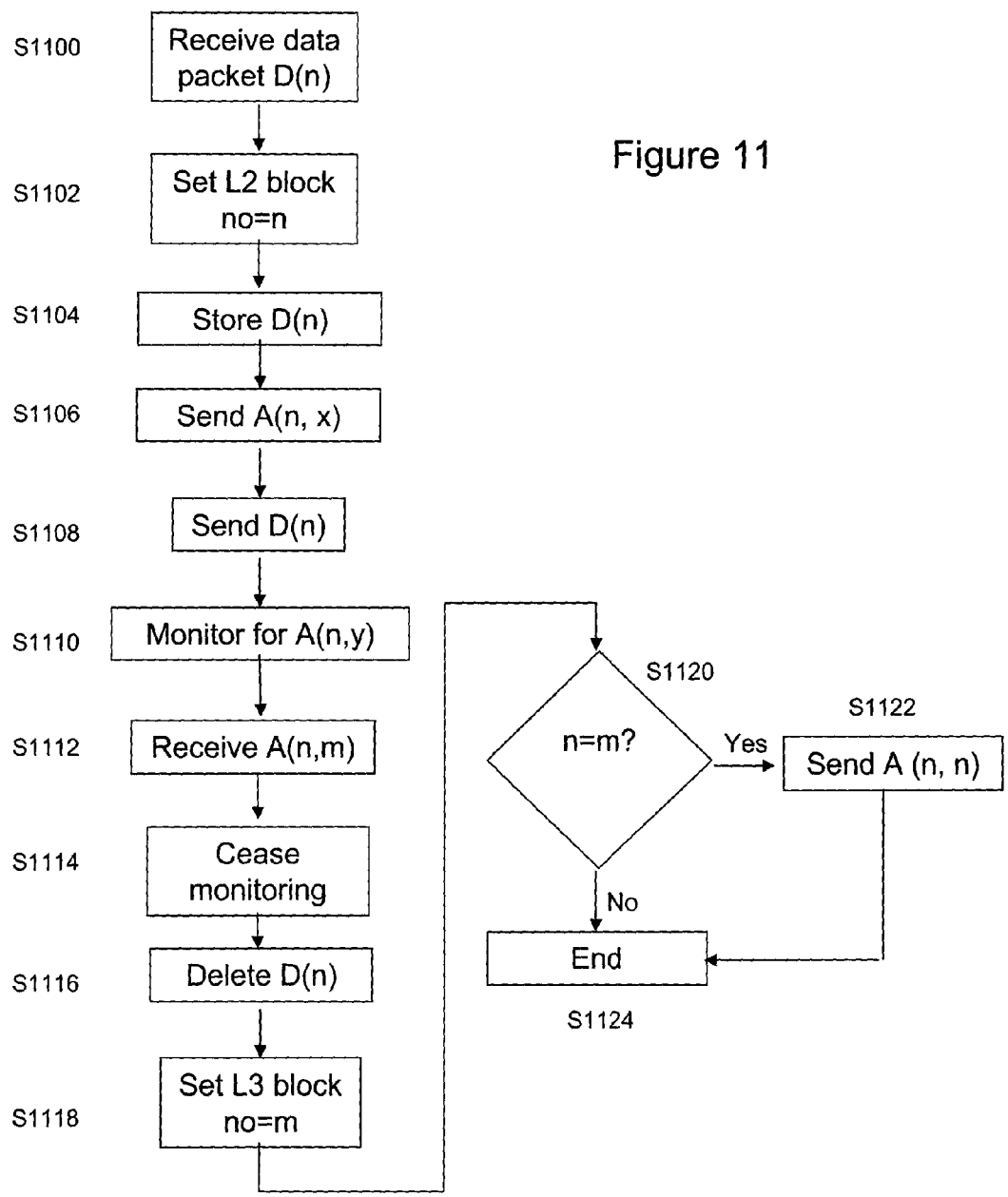
FIG. 11 is a flow diagram showing the operation of a relay node transmitting and acknowledging data in accordance with a second embodiment of the present invention.

FIG. 11 is a flow diagram showing the operation of a relay node 100b in transmitting and acknowledging primary data according to an embodiment of the present invention; we again consider the case of a connection from a sending node 100a to a receiving node 100c via a relay node 100b. At step S1100 the relay node 100b receives primary data packet D(n). At step S1102, the processing unit 104 of relay node 100b sets the L2PN to n; an indication of the L2PN and an indication of the L3PN may be stored in the store 106. We are here assuming that packet D(n) is received correctly and in sequence i.e. that all primary data packets in the sequence packet D(1)... D(n−1) have also been correctly received at the relay node 100b. If this is not the case because, for example, packet D(n−1) has not been received at the relay node 100b, step S1102 and subsequent steps may be altered; for example, L2PN may not be set to n, and the following steps may not be performed until packet D(n−1) and packet D(n) are both correctly received.

Returning to FIG. 11, at step S1104, packet D(n) is stored in the store 106. An ack, ack A(n,x), is sent to the sending node 100a at step S1106. At step S1108, packet D(n) is sent to receiving node 100c, and at step S1110 the processing unit 104 starts monitoring for an ack for packet D(n) having an L2BN of n. If no such ack is received within a predetermined time interval, packet D(n) may be resent; however, in this example, such an ack, ack A(n,m) is received at step S1112. Since ack A(n,m) has an L2PN of n, indicating that packet D(n) has been correctly received at by the receiving node 100c, at step S1114 the processing unit 104 ceases the monitoring started at step S1110, and deletes packet D(n) from the store 106 at step S1116.

At step S1118, the L3PN of the relay node 100b is set equal to m. At step S1120, the processing unit 104 determines whether its L2PN (n) is equal to its L3PN (m). If they are not equal, the process ends at step S1124; however, if they are equal, a further ack A(n,n) is sent to the sending node 100a at step S1122; this further ack ensures that receipt of the final primary data packet of the sequence at the receiving node 100c is notified to the sending node 100a.

Figure 12:
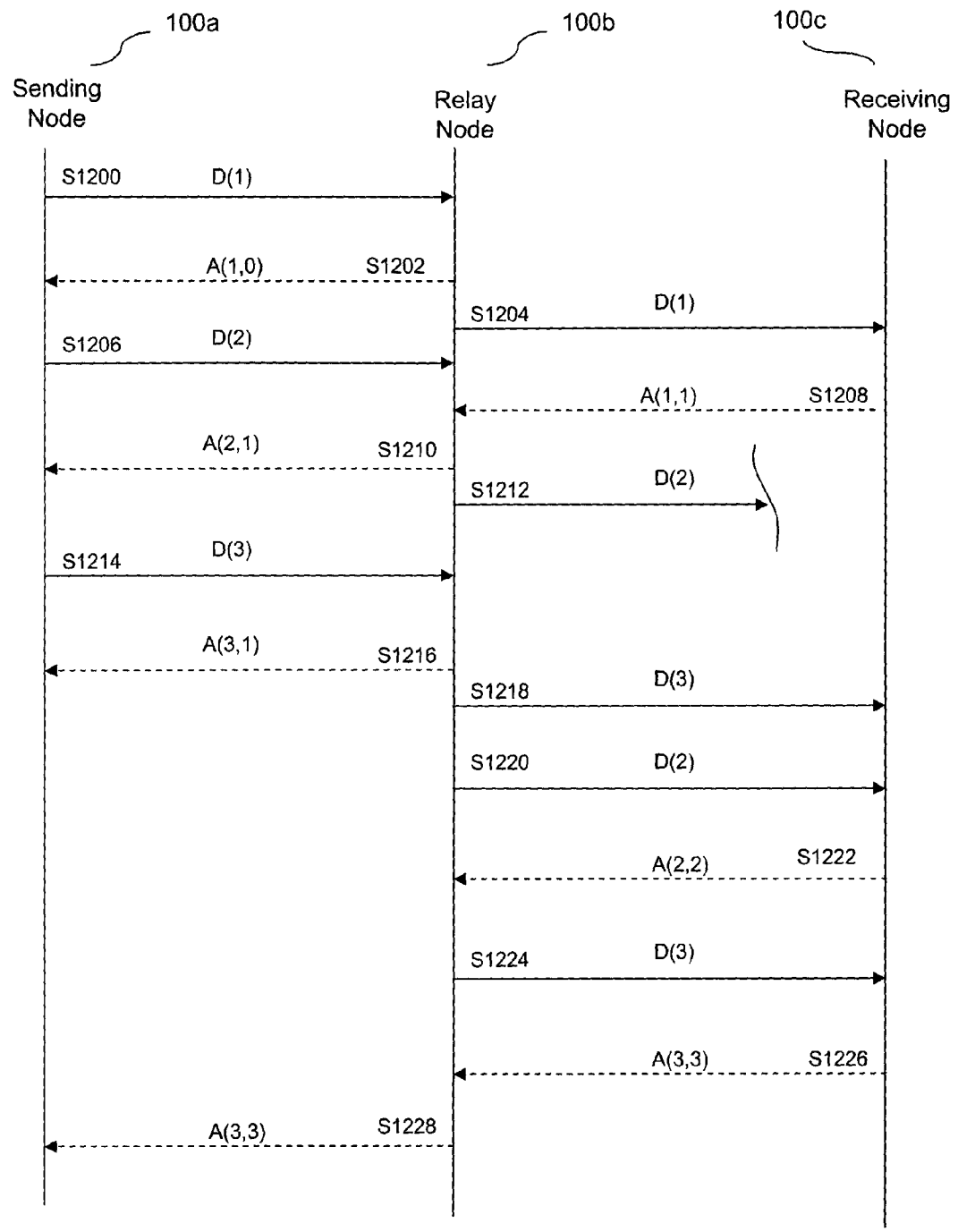
FIG. 12 is a schematic timing diagram showing an example of data being sent and acknowledged in a system comprising a sending node, a relay node and a receiving node in accordance with a second embodiment of the present invention.

FIG. 12 shows an example data transmission session between a sending node 100a, a relay node 100b and a receiving node 100c, in which a sequence of three primary data packets packet D(1) to packet D(3) is transmitted and acknowledged according to this further embodiment. At step S1200 the sending node 100a sends packet D(1) to the relay node 100b; in response, the relay node sets its L2PN to 1. At step S1202, the relay node 100b sends ack A(1,0) to the sending node 100a, and sends packet D(1) to the receiving node 100c at step S1204. The receiving node correctly receives packet D(1); in the following discussion, references to a receiving node 100c correctly receiving a primary data packet should be taken to mean the receiving node 100c correctly receiving the primary data packet at its L2 processing component 108 and at its L3 processing component 110.

At step 1206, the sending node 100a sends packet D(2) to the relay node 100b; in response, the relay node 100b sets its L2PN to 2. Before the relay node 100b sends an ack to acknowledge packet D(2), the receiving node 100c sends ack A(1,1) to the relay node 100b at step S1208; on receipt of ack A(1,1) the relay node 100b to sets its L3PN to 1. The ack corresponding to packet D(2) sent from the relay node 100b to the sending node 100a at step S1210 therefore takes the form A(2,1). This notifies the sending node 100a that packet D(1) has been correctly received at the L3 processing component 110 of the receiving node 100c. It should be noted that all acks sent from the receiving node have an L3PN equal to the L2PN.

At step S1212, packet D(2) is sent from the relay node 100b; however it is not received at the receiving node 100c, and no ack is therefore sent thereby. At step S1214, the sending node 100a sends packet D(3) to the relay node 100b; in response to receiving packet D(3), the relay node 100b sets its L2PN to 3, and sends ack A(3,1) to the sending node 100a at step S1216. At step S1218 the relay node 100b sends packet D(3) to the receiving node 100c. Packet D(3) is received at the receiving node 100c; however, since packet D(2) has not yet been received at the receiving node 100c, packet D(3) is not received in sequence, and no corresponding ack is sent from the receiving node 100c.

Since the relay node 100b has not received an ack for packet D(2), it resends packet D(2) at step S1220; this may be due to a predetermined time interval having elapsed. On this occasion, packet D(2) is correctly received by the receiving node 100c, which sends ack A(2, 2) to the relay node 100b at step S1222. The relay node 100b resends packet D(3) at step S1224; the relay node 100b may be arranged to do this automatically in response to resending packet D(2), or it may resend packet D(3) in response to not receiving a corresponding ack, or in response to some other factor. In some arrangements, it may not be necessary to resend packet D(3), since it has already been correctly received at step S1218. This may be achieved by, for example, arranging so that the receiving node 100c sends an ack notifying receipt of packet D(3) after sending ack A(2, 2) at step S1222.

Packet D(3) is correctly received at the receiving node 100c, which acknowledges receipt of packet D(3) by sending ack A(3,3) to the relay node 100b at step S1226. On receiving ack A(3,3), the relay node 100b sets its L3PN to 3; since the L3PN and L2PN for the relay node are now equal, A(3,3), is sent from the relay node 100b to the sending node at step S1228. This notifies the sending node 100a that packet D(3) has been correctly received at the receiving node 100c. Further, although the sending node 100a has not received an ack having an L3PN of 2, since the receiving node 100c sends A(3,3) in response to packet D(3) being correctly received in sequence, receipt of A(3,3) also notifies the sending node 100a of correct receipt of packet D(2).

It is to be noted that the sending node 100a monitors for receipt of acks having an L3PN corresponding to primary data packets it has sent. For example, a primary data packet D(q) having packet number q may be resent in response to not receiving an ack of the form A(p,q) within a certain time period.

This embodiment thus provides a method of acknowledging primary data using L2 acks that allows the sending node 100a to be informed of receipt of primary data at the receiving node 100c, thus providing advantageous features of both end to end methods and point to point methods, using only L2 acks.

The above embodiments are to be understood as illustrative examples of the invention. Further embodiments of the invention are envisaged. For example, in the above examples, connections involving only three nodes were considered. As mentioned above, the invention is not limited to such connections, and may be applied to connections comprising any number of nodes. In some cases data may be transmitted in a connection comprising a plurality of relay nodes; in these cases, on receipt of data by a relay node, the L2 processing component 108 of the node analyses the data to determine its destination address; if the destination address is different to the address of the current node, the data is sent to a node nearer to the destination address; if the data is primary data, an ack may be sent to a node nearer to the source of the primary data packet. In connections comprising more than three nodes, the principles explained above in relation to a receiving node 100a, relay node 100b and receiving node 100c apply equally to any three nodes forming part of the connection.

Further, in FIG. 8, separate L2 and L3 acks were sent from the relay node 100b. However, in some arrangements, the relay node 100c may send an L2L3 at step S818 instead of the L2 ack sent at step S806 and the L3 ack sent at step S818, as described in reference to FIG. 5b. This may particularly be the case where there is a short propagation time for sending data between the relay node 100a and the receiving node 100c.

In the above examples, L3 acks were created and sent in response to primary data being received at L3 of a receiving node; however, in some arrangements, L3 acks may be sent in response to primary data being received at the receiving node, but not at L3.

In the section entitled "System Using Only L2 Acks", each data packet had an indicator of an L2PN and an indicator of an L3PN. However, in some arrangements other indicators may be used; for example, an indicator of an L2PN and an indicator or a difference between an L2PN and an L3PN may be used.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A relay node for transmitting data in a network, the network comprising the relay node, a sending node and a receiving node, the receiving node and the relay node being configured to receive data via the network at a first protocol layer and a second protocol layer of a protocol layer stack, the first protocol layer being for transmitting data between adjacent nodes of a connection and the second layer being for establishing a connection in respect of the data, and to send different types of notifications identifying receipt of data, the different types of notifications including: a first type of notification identifying receipt of data at the first protocol layer of the node from which the notification is sent; and a second type of notification identifying receipt of data at the first protocol layer of the node from which the notification is sent and at the second protocol layer of the receiving node, the relay node comprising: an interface for receiving data at the first protocol layer of the relay node, the data having been sent from the sending node, wherein the interface is configured to send the data to the receiving node; and means for monitoring for a given notification of the second type from the receiving node, wherein the relay node is configured to: cease the monitoring and send, to the sending node, a notification of the second type, in response to receiving the given notification; and send, to the sending node, a notification of the first type, in response to a predefined period elapsing without receipt, at the relay node, of the given notification.

2. The relay node according to claim 1, wherein the relay node comprises a memory for storing the data and configured to remove the data from the memory in response to receiving the given notification.

3. The relay node according to claim 1, wherein the relay node is configured to: send, in response to receipt of the given notification at the receiving node after the predetermined time limit has elapsed, a third type of notification, different to the first and second types of notification, the third type of notification identifying receipt of data at the second protocol layer of the receiving node; monitor for a confirmation of receipt of the third type of notification at the sending node; and resend the third type of notification in response to not receiving the confirmation.

4. The relay node according to claim 1, wherein each of the notifications comprises an identifier of the data.

5. The relay node according to claim 1, wherein the interface comprises a plurality of interfaces, each configured to receive data at one of the protocol layers of the protocol stack.

6. A method of transmitting data in a network, the network comprising a sending node, a relay node and a receiving node, the receiving node and the relay node being configured to receive data via the network at a first protocol layer and a second protocol layer of a protocol layer stack, the first protocol layer being for transmitting data between adjacent nodes of a connection and the second layer being for establishing a connection in respect of the data, and to send different types of notifications identifying receipt of data, the different types of notifications including: a first type of notification identifying receipt of data at the first protocol layer of the node from which the notification is sent; a second type of notification identifying receipt of data at the first protocol layer of the node from which the notification is sent and at the second protocol layer of the receiving node; and a third type of notification identifying receipt of data at the second protocol layer of the receiving node, the method comprising: receiving data sent from the sending node at the relay node, and sending the data to the receiving node; receiving a notification at the relay node, the notification being for notifying the sending node of receipt of the data at the receiving node; determining whether the notification is of the second type or the third type of notification; in first case that the notification is determined to be of the second type, not sending a confirmation of receipt of the notification at the relay node to the receiving node; in a second case that the notification is determined to be of the third type, sending the confirmation of receipt; in either case, sending a notification for identifying receipt of data at the receiving node to the sending node, and monitoring for a confirmation of the sent notification having been received at the sending node; and resending the sent notification in response to a predetermined time period elapsing prior to receipt of the confirmation of the sent notification having been received at the sending node.

7. The method according to claim 6, in which the received notification comprises an identifier of a type of notification and the determining comprises using the identifier.

8. The method according to claim 7, in which the determining comprises comparing the identifier with a predetermined set of identifiers.

9. The method according to claim 8, in which the predetermined set of identifiers is stored at the relay node.

10. A node adapted to perform the method of claim 6.

11. A non-transitory computer readable storage medium storing computer readable instructions thereon for execution on a node to implement a method of transmitting data in a network according to claim 6.

12. A method of transmitting data in a network, the network comprising a sending node, a relay node and a receiving node, the receiving node and the relay node being configured to receive data via the network at a first protocol layer and a second protocol layer of a protocol layer stack, the first protocol layer being for transmitting data between adjacent nodes of a connection and the second layer being for establishing a connection in respect of the data, and to send different types of notifications identifying receipt of data, the different types of notifications including: a first type of notification identifying receipt of data at the first protocol layer of the node from which the notification is sent; and a second type of notification identifying receipt of data at the first protocol layer of the node from which the notification is sent and at the second protocol layer of the receiving node, the method comprising: receiving data at the first protocol layer of the relay node, the data having been sent from the sending node, wherein the interface is configured to send the data to the receiving node; and monitoring for a given notification of the second type from the receiving node; ceasing the monitoring and sending, to the sending node, a notification of the second type, in response to receiving the given notification; and sending, to the sending node, a notification of the first type, in response to a predefined period elapsing without receipt, at the relay node, of the given notification.

* * * * *